Figure 1:
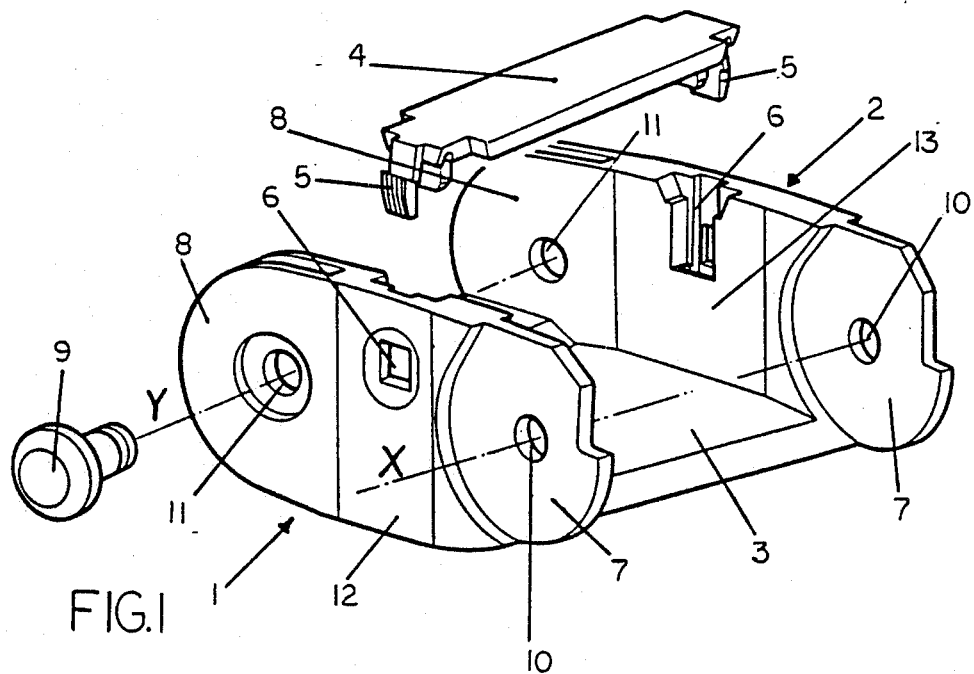

United States Patent [19]

Mauri

[11] Patent Number: 4,807,432

[45] Date of Patent: Feb. 28, 1989

[54] CHAIN FOR SUPPORTING FLEXIBLE CONDUITS WITH CURVILINEAR PATH

[76] Inventor: Giovanni Mauri, 2, Via dei Prati, I 20052 Monza, Province of Milano, Italy

[21] Appl. No.: 139,657

[22] Filed: Dec. 30, 1987

[30] Foreign Application Priority Data

Jan. 2, 1987 [IT] Italy .................. 20401/87[U]

[51] Int. Cl.4 ............................................. F16G 13/16
[52] U.S. Cl. ...................................... 59/78.1; 248/49; 248/68.1
[58] Field of Search ...................... 59/78.1, 78; 248/49, 248/51, 52, 68.1

[56] References Cited

U.S. PATENT DOCUMENTS

| | | | |
|---|---|---|---|
| 4,392,344 | 7/1983 | Gordon | 59/78.1 |
| 4,600,817 | 7/1986 | Hackenberg | 59/78.1 |
| 4,625,507 | 12/1986 | Moritz et al. | 59/78.1 |
| 4,626,233 | 12/1986 | Moritz | 59/78.1 |
| 4,672,805 | 6/1987 | Moritz | 59/78.1 |

*Primary Examiner*—David Jones

*Attorney, Agent, or Firm*—McAulay, Fields, Fisher, Goldstein & Nissen

[57] ABSTRACT

A chain with curvilinear path for supporting flexible conduits of the type in which the links are constituted by two sides each having a male connection at one end and a female connection at the other, which can be connected male to female to the adjacent link by way of an appropriate dowel thus permitting reciprocal articulation, said sides being connected to one another by means of a root and a detachable upper link stud which form the support surface for the flexible conduits carried by the chain, characterized by the fact that the said links are curvilinear, thus permitting articulated movement of each link in order to follow the traditional curve during the back and forth movement but also to take on a skewed attitude during the course of the curve in order to be able to follow the rotational movements of the rotating equipment which must be supplied by the flexible conduits. Thus this chain can also be applied to machine tools and robots which carry out reciprocal rotary movements.

4 Claims, 1 Drawing Sheet

CHAIN FOR SUPPORTING FLEXIBLE CONDUITS WITH CURVILINEAR PATH

This invention concerns a chain for supporting flexible conduits which has a remarkable range of utilisations since it can be used on a category of machines on which conventional flexible conduit supporting chains could not be used up until now.

It is well-known that chains for supporting flexible conduits are mobile raceways formed out of a series of articulated links which are used to feed the utilities conduits to equipment provided with reciprocal back and forth movement and that they have found a wide range of applications.

The links of this chain, generally made of plastic with the appropriate characteristics or of metal, are constituted by two sides with a male connection at one end an a female connection at the other end, connected male to female to the adjacent link in the direction of movement of the chain by means of a dowel in order to provide reciprocal articulation.

These sides are connected to one another by means of a root and an upper link stud which form the support surface for the utilities cables which pass through the conduits, which can be electricity supply cables or flexible pipes for supplying various fluid substances such as water, gas, compressed air, steam, liquid or gaseous chemical compounds etc.

While the field of application of these conduit support chains is already enormous, they cannot be used on machines which have rotary movements, since the traditional support chains can only be used on machines with reciprocal back and forth movements.

The increasingly widesprad use of robots in all sectors of industry has brought to light the difficulties involved in supplying the utilities conduits of these robots, since most of them carry out rotational movements.

The present invention provides a brilliant solution to this pressing problem, consisting of a chain for supporting flexible conduits which permits the movements of the robot to be followed, or the movements of a rotating head or any other equipment which carries out rotating movements.

The conduit supporting chain of this invention, is therefore, made up of links whose structure is generally similar to the structure of the links of the laterally-moving rectilinear conduit supporting chains previously described, but having a curvilinear path which permits the links to rotate separately in order to follow the traditional curve during the back and forth movement and also to perform a skewed movement during this curve so that they can follow the rotary movements of the equipment which must be fed by the utilities conduits.

Figure 2:
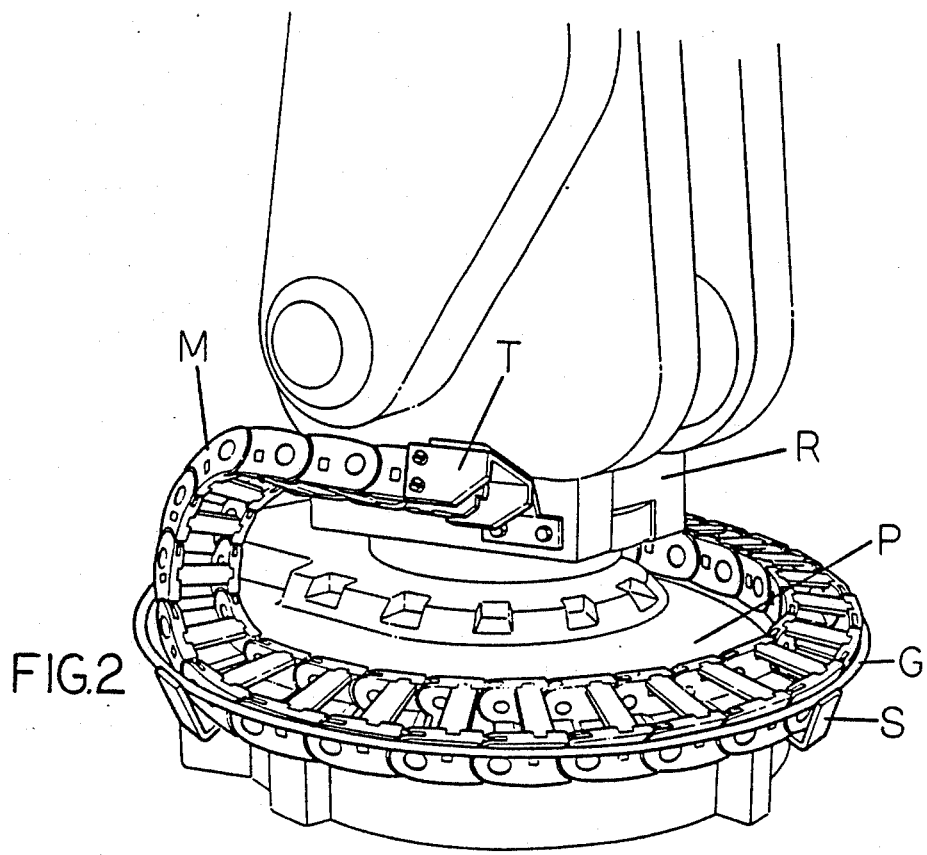

The objectives, characteristics and advantages of the curvilinear path conduit supporting chain according to the present invention will become clear from the following detailed description of one embodiment, given here as a non-limiting example, and referring to the attached illustrative drawings, in which:

FIG. 1 is an enlarged front view of one of the links of the conduit supporting chain according to this invention; and FIG. 2 is a front view of an example of one embodiment of this conduit suppoting chain, an application for the transport of the service conduits to a rotating robot.

Referring now to FIG. 1 in the attached drawings, one can see one of the links of the conduit supporting chain according to this invention. As usual, it is constituted by two sides 1 and 2, a root 3 and a clip-together link stud 4 with its sprocket 5 in the appropriate seat 6 of the sides. The link stud 4 can be wider than is shown here or can even close the whole of the upper surface of the link. Sides 1 and 2 are provided with a male connection 7 at one end in the form of a protruding shaped tongue while a female connection 8 of an appropriate shape is provided at the other end of sides 1 and 2, in the form of two parallel slotted or forked fins, into which the male connection 7 of the adjacent link slots in. They are then united by the dowel 9 which passes through the two holes 10 and 11 of respectively the male connection 7 and the female connection 8.

Up to this point, the structure of the link is absolutely the same as that of the conventional rectilinear conduit supporting chain. The basic characteristic of the link according to this invention is its curvilinearity, a characteristic which is conferred for example by the trapezoidal shape of the central part of the link, so that the inner side 12 is shorter than the outer side 13, and, therefore, the axis X of the holes 10 forms an angle with the axis Y of the holes 11 which constitutes the curve radius of the chain. The curvilinearity of the link could also be continuous as long as easy insertion of the male connection into the adjacent female connection is guaranteed.

In this way, a conduit supporting chain made up of links according to the present invention can not only perform all the mutual reciprocal back and forth movements with the relative curve to follow the equipment in movement, but can also follow a circular path on the support plane, and, in addition, follow the rotational movement of the equipment, becoming skewed when carrying out the approach curve to the equipment.

This characteristic result of the conduit supporting chain according to the present invention can be clearly seen in the descriptive illustration in FIG. 2, where we can see a conduit supporting chain according to the present invention applied to a rotary movement robot R, to which the chain is attached by its terminal link T. The drawing clearly shows how the links M, of the type described in detail previously with reference to FIG. 1, follow the rotary movement of the robot R, performing a skewed curve while they carry out a circular path on the support surface P, following a guide G fixed to the support surface by the brackets S, for example.

Obviously, the size of the links of the conduit supporting chain according to the present invntion can vary according to what has to be transported and the curve radius of the links can be adapted to the size of the rotating equipment which has to be served and, therefore, the curvilinear path which the chain has to follow. In addition, the links can be made of any type of suitable material, particularly plastic material of any appropriate degree of resistance such as nylon for example. Finally, numerous modifications, variations, additions and/or substitutions of elements can be made without in any way departing from the spirit or objective of this invention and still remaining within its ambit of protection which are all clearly defined in the claims attached hereto.

I claim:

1. A chain for supporting flexible conduits and adapted to lie in a curvilinear path comprising a plurality of links, each of said links having opposed side walls, a male connector at one end and a female connector at the other end of said link formed complimentary to said male connector, whereby the female connector of one link is interengageable with the male connector of an adjacent link; said male and female connectors having aligned openings when interengaged; a dowel adapted to be received in said aligned openings to connect together the interengaged links for articulated movement; a bottom root extending between said side walls, an upper link stud operable to provide a support surface for flexible conduits carried by said chain, connecting means between said stud and said side walls for removably connecting said stud to said side walls; one of said side walls having a longitudinal length longer than the longitudinal length of said other side wall to provide a root having a trapazoidal shape along its longitudinal edges, whereby said interconnected links form a chain curvilinear in a horizontal plane due to said trapezoidal shape and in a vertical plane due to said articulated linkage.

2. A chain as in claim 1, in which said openings in said male connector lie along a first axis, and said openings in said female connector lie along a second axis, said first and second axis converging toward each other to define the radius of curvature of said chain at the point of intersection of said first and second axes.

3. A chain as in claim 1, in which said links are fabricated from a plastic material.

4. A chain as in claim 1, in which said links are fabricated from nylon.

* * * * *